(12) United States Patent
Chu et al.

(10) Patent No.: US 12,503,323 B2
(45) Date of Patent: Dec. 23, 2025

(54) LOADING/UNLOADING SYSTEM AND METHOD FOR QUAY TYPE FULL-AUTOMATIC CONTAINER TERMINAL

(71) Applicant: Tianjin Port Second Container Terminal Co., Ltd., Tianjin (CN)

(72) Inventors: Bin Chu, Tianjin (CN); Guangjun Jiao, Tianjin (CN); Jiemin Yang, Tianjin (CN); Rong Yang, Tianjin (CN); Yanhui Gao, Tianjin (CN); Pei Chen, Tianjin (CN); Kai Zhang, Tianjin (CN); Bin Wu, Tianjin (CN); Xiwang Liu, Tianjin (CN); Hao Chai, Tianjin (CN); Xichao Kong, Tianjin (CN); Miao Feng, Tianjin (CN); Pai Peng, Tianjin (CN); Qiu Li, Tianjin (CN)

(73) Assignee: TIANJIN PORT SECOND CONTAINER TERMINAL CO., LTD., Tianjin (CN)

(*) Notice: Subject to any disclaimer, the term of this patent is extended or adjusted under 35 U.S.C. 154(b) by 586 days.

(21) Appl. No.: 17/962,457

(22) Filed: Oct. 7, 2022

(65) Prior Publication Data

US 2023/0116732 A1   Apr. 13, 2023

(30) Foreign Application Priority Data

Oct. 8, 2021   (CN) .......................... 202111168335.0

(51) Int. Cl.
*B65G 63/00* (2006.01)
*B65G 67/60* (2006.01)

(52) U.S. Cl.
CPC .......... *B65G 63/004* (2013.01); *B65G 67/60* (2013.01)

(58) Field of Classification Search
CPC .......... B65G 63/004; B65G 2201/0235; B65G 67/60; B65G 67/02; B65G 67/00;
(Continued)

(56) References Cited

U.S. PATENT DOCUMENTS

| | | | |
|---|---|---|---|
| 10,636,107 B2* | 4/2020 | Ryu | ...................... B65G 63/004 |
| 2012/0092643 A1* | 4/2012 | Rintanen | ................. B66C 13/46 356/4.01 |

(Continued)

*Primary Examiner* — Timothy R Waggoner
(74) *Attorney, Agent, or Firm* — MATTHIAS SCHOLL P.C.; Matthias Scholl

(57) ABSTRACT

A loading/unloading system for a quay type full-automatic container terminal includes a plurality of shore cranes, an operation lane area between two rails of the shore cranes, an operation area from a rear side of a landside rail of the shore cranes to a yard, an automatic container yard area, an operation lane area of the yard, and facilities behind the yard. The shore cranes are disposed in parallel at a front edge of a container terminal to autonomously complete shipping and unshipping operations of containers, and autonomously complete loading/unloading processes of artificial intelligence transportation robots through information interaction with an artificial intelligence transportation robot system. The operation lane area between two rails of the shore cranes includes: a lambdoidal reverse operation area of inner container trucks, a ship lofting operation area, and a loading/unloading operation area of the inner container trucks, which are physically isolated by fences.

5 Claims, 4 Drawing Sheets

(58) Field of Classification Search
CPC .... G06Q 10/08; G06Q 10/083; G06Q 10/087; B66C 13/48
See application file for complete search history.

(56) References Cited

U.S. PATENT DOCUMENTS

| | | | | |
|---|---|---|---|---|
| 2015/0112476 | A1* | 4/2015 | Torson | G06Q 10/047 |
| | | | | 700/214 |
| 2017/0357026 | A1* | 12/2017 | Gallagher | G01V 5/22 |
| 2020/0307924 | A1* | 10/2020 | Wieschemann | G08G 9/02 |
| 2021/0354937 | A1* | 11/2021 | Kiyohara | B65G 63/004 |

\* cited by examiner

LOADING/UNLOADING SYSTEM AND METHOD FOR QUAY TYPE FULL-AUTOMATIC CONTAINER TERMINAL

CROSS-REFERENCE TO RELATED APPLICATIONS

Pursuant to 35 U.S.C. § 119 and the Paris Convention Treaty, this application claims foreign priority to Chinese Patent Application No. 202111168335.0 filed Oct. 8, 2021, the contents of which, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, MA 02142.

BACKGROUND

The disclosure relates to a loading/unloading system and method for a quay type full-automatic container terminal.

Conventionally, shipping and unshipping operations of a container terminal generally use shoreside loading/unloading cranes (hereinafter referred to as "shore cranes"). The shore cranes can be divided into single trolley shore cranes and double trolley shore cranes according to the quantity of trolleys, can be divided into single lifting shore cranes and double lifting shore cranes according to container lifting forms, and can be divided into double 20 ft shore cranes, double 40 ft shore cranes and four 20 ft shore cranes according to container lifting apparatus forms. There are four common models: single trolley double 20 ft shore cranes, single trolley double 40 ft shore cranes, double trolley double 20 ft shore cranes and double trolley double 40 ft shore cranes. For model section of the shore cranes, it is needed to comprehensively consider structural characteristics of container cargoes, requirements on loading/unloading efficiencies, yard arrangement forms, horizontal transportation modes and lock disassembling and assembling operation modes of containers. Automatic container yards in a technical mode of combined operations of "perpendicular yard arrangement+two automatic rail type container gantry cranes (the gantry cranes are high speed gantry cranes without cantilevers)+end loading/unloading" have been quite sophisticated, which is the technical solution generally used by a majority of automatic terminals so far. However, such a perpendicular end loading/unloading mode centralizes horizontal transportation containers and outer container truck collecting and distributing loading/unloading points, and has relatively few loading/unloading points, which results in difficulty to organize landside traffic. Meanwhile, it is needed to transport containers from a long distance by automatic rail-mounted gantry cranes in the yard with containers, so that the energy consumption is high, and it is difficult to support seaside and landside loading/unloading operations and collecting and distributing each other. At present, horizontal transportation devices generally used in the perpendicular yard arrangement forms of the automatic container terminals at home and aboard are automatic guided vehicles (AGV for short) and low gantry straddle carriers (straddle carriers for short). Since there are coupling operations between AGVs and shore cranes and automatic rail-mounted gantry cranes, the loading/unloading efficiencies of this type of automatic container terminals are limited, and the energy consumption is high. At the same time, as a result of high costs of AGV devices themselves, a navigation system (with magnetic nails paved on the ground) and software, there are application limitations of high costs of newly built terminals and large difficulty in transformation of old terminals.

SUMMARY

The disclosure provides a loading/unloading system and method for a quay type full-automatic container terminal.

A loading/unloading system for a quay type full-automatic container terminal comprises a plurality of shore cranes, an operation lane area between two rails of the shore cranes, an operation area from a rear side of a landside rail of the shore cranes to a yard, an automatic container yard area, an operation lane area of the yard, and facilities behind the yard; the shore cranes are single trolley double 20 ft shore cranes, and the shore cranes are disposed in parallel at a front edge of a container terminal to autonomously complete shipping and unshipping operations of containers, and autonomously complete loading/unloading processes of artificial intelligence transportation robots through information interaction with an artificial intelligence transportation robot system;

the operation lane area between two rails of the shore cranes are divided into three segmented operation areas: a lambdoidal reverse operation area of inner container trucks, a ship lofting operation area, and a loading/unloading operation area of the inner container trucks, which are physically isolated by fences;

the operation area from the rear side of the landside rail of the shore cranes to the yard is successively divided into five sub-areas from a seaside to a landside: a hatch cover area, an unlocking and locking area of the inner container trucks, an unlocking and locking buffer area, a passing area of the inner container trucks and a charging area of the inner container trucks, which are not physically isolated, thereby facilitating cooperation among the areas in operation;

the automatic container yard area is disposed in parallel to and adjacent to the operation area at the front edge of the container terminal, and comprises a plurality of yards disposed in parallel to a water front and a plurality of automatic rail-mounted gantry cranes disposed in parallel to the yards;

the facilities behind the yard comprise intelligent arrival and departure gates, an in-yard parking lot and an auxiliary building area, which is convenient for recording information of outer container trucks arriving and departing the port and arranging collecting and distributing operations of the outer container trucks;

the container terminal is disposed in a quay type, and vehicles enter a container area to operate in a loading while unloading manner; and container operation berths are disposed in a full type, and a plurality of berths are disposed at the water front of the container terminal in a "-" shape.

In a class of this embodiment, the ship lofting operation area comprises three passing lanes, and the loading/unloading operation area of the inner container trucks comprises five passing lanes; and the ship lofting operation area and the loading/unloading operation area of the inner container trucks are independent and are isolated by a fence.

In a class of this embodiment, the hatch cover area is disposed in parallel behind a shipping and unshipping operation area, and used to stack hatchway covers of ships, or used as a parking area of the inner container trucks without operation.

In a class of this embodiment, the lambdoidal reverse operation area of the inner container trucks is dynamically disposed at the front edge of the container terminal according to changes of the berths for realizing reverse operation of the containers, thereby satisfying the requirements on container loading/unloading operations.

In a class of this embodiment, the unlocking and locking area of the inner container trucks is disposed in parallel behind the hatch cover area and comprises an unlocking and locking operation area of the inner container trucks and an unlocking and locking buffer area. The unlocking and locking operation area of the inner container trucks comprises one operation lane where a plurality of movable unlocking islands are arranged, and each of the movable unlocking islands receives one inner container truck for unlocking and locking operation; the unlocking and locking buffer area comprises six passing lanes of the inner container trucks, where the first and fourth passing lanes are overtaking lanes, the second, third, fifth and sixth passing lanes are lanes for the inner container trucks to unlock and lock, and front and back buffer areas are disposed on multiple lands to further realize multistage buffer ordering of ground unlocking.

In a class of this embodiment, the passing area of the inner container trucks comprises four passing lanes, where the first and second lanes are southing lanes and the third and fourth passing lanes are northing lanes.

In a class of this embodiment, the charging area of the inner container trucks comprises one operation lane where a plurality of charging devices is disposed in parallel, and the inner container trucks drive into vacant charging spots of the charging lanes from the passing lanes for charging operation.

In a class of this embodiment, an automatic yard is disposed in the automatic container yard area according to types of the containers; empty and heavy containers are stacked in a mixed manner in the automatic yard; operations of the inner and outer container trucks are respectively carried out on two sides of a double cantilever rail-mounted gantry crane; the container yard area comprises transverse lanes and longitudinal lanes; the transverse lanes comprise inner container truck transverse lanes and outer container truck transverse lanes, which are alternately disposed on two sides of the yard; the longitudinal lanes are disposed at two ends of the yard; inner container truck longitudinal lanes and outer container truck longitudinal lanes are disposed at each end of the yard, and are physically isolated for separated passing; driving of the outer container trucks is controlled at an intersection by utilizing a cooperative vehicle infrastructure system, and permitted release of vehicles and containers coming in and going out of the yard is automatically controlled by utilizing a lane control system.

A loading/unloading method for a quay type full-automatic container terminal, the method comprising:

S1: shipping and unshipping operation: during unshipping, unloading containers from a container ship by utilizing single trolley double 20 ft shore cranes, transferring the containers to artificial intelligence transport robots waiting in the loading/unloading operation area of the inner container trucks, transporting, by the artificial intelligence transport robots, the containers to target operation positions of the yard through the inner container truck lanes along anticlockwise directions, then hoisting, by the automatic rail-mounted gantry cranes, the containers to appointed locations, and allowing the inner container trucks to continuously enter a next operation cycle along appointed lanes, where containers carrying hazardous goods are transferred by shore crane trolleys to the outer container trucks waiting in the ship lofting operation area and are directly transported out of the terminal area by the outer container trucks along a regulated route; and during unshipping, carrying out reverse operations as that during unshipping; and S2: container collecting and dispatching operations: in a collecting process, allowing the outer container trucks to drive onto outer container truck lanes from arrival and departure gates and a parking lot and further to enter appointed positions of the operation area of the yard, hoisting, by the automatic rail-mounted gantry cranes, the containers to appointed locations, and allowing the outer container trucks unloading the containers to continuously leave a harbor district along the outer container truck lanes; and during container dispatching, carrying out reverse operations as that during container collecting.

Compared with the prior art, the disclosure has the beneficial effects that the quay type full-automatic container terminal provided by the disclosure is more reasonable in overall layout, and the functional areas are split in detail and are jointed more tightly in operation, thereby contributing to completing operation tasks by the automatic devices of the terminal efficiently. The container operation berths are disposed in a full manner, and a plurality of berths are disposed at the water front of the container terminal in a "-" shape, so that resources of the water front of the container terminal are utilized to the maximum extent, and the ship waiting time is shortened, thereby contributing to formulating an efficient berth plan. The operation area between two rails of the shore cranes are segmented into a ship lofting operation area and a loading/unloading operation area of the inner container trucks and are isolated by a fence to realize physical isolation so as to guarantee safe operation. The operation areas are provided with operation lanes and overtaking lanes in proportion, so that the probability of congestion is reduced, and the turnover frequency of the container trucks is accelerated. The charging area is disposed between a lock station area and a yard area, so that the driving distance of the container trucks to charge is shortened. After charging, the container trucks can drive to the task positions rapidly to shorten the invalid driving distance, thereby improving the efficiency.

The disclosure abandons an arrangement mode that the conventional automatic yard is perpendicular to the water front of the container terminal, designs a yard layout parallel to the water front of the container terminal, isolates the passing lanes of the inner and outer container trucks in the yard area, and cuts off a passing intersection path of the inner and outer container trucks through a lifting lever, so as to manage and control the passing order of the inner and outer container trucks in the yard, thereby shortening the waiting times of the vehicles. Meanwhile, the yard operation mode is changed from point loading/unloading to loading while unloading, and the quantity of the loading/unloading points is increased greatly, so that the operation flexibility is enhanced, the waiting times of the container trucks are shortened, and the loading/unloading capacities of the rail-mounted gantry cranes are improved. At the same time, the automatic rail-mounted gantry cranes in the yard does not need long distance conveyance with containers, so that the energy consumption of the devices is reduced, the loading/unloading operation efficiency of the containers in the yard is improved, and it contributes to cooperating and supporting loading/unloading devices in the yard.

By adopting a single trolley shore crane ground unlocking process, the investment and energy consumption of the shore cranes are greatly reduced, and it further contributes to improving the efficiency of the shore cranes by freely selecting public lock islands decoupled with the shore crane. Multi-buffering ordering is realized, the utilization rate of the lock islands is improved, the problem of traffic congestion in a strict shipping mode is solved, a one-to-many mode is realized, the unlocking personnel can be saved, and it is predicted that the ratio of the lock islands to the shore cranes is 1:1.5, thereby laying a foundation for replacing it with full-automatic unlocking. The automatic terminal is disposed in a quay type as a whole. Compared with a perpendicularly disposed end loading/unloading process, the automatic terminal has the characteristics of energy conservation, efficiency, investment saving and the like, and is higher in degree of intelligence.

Figure 1:
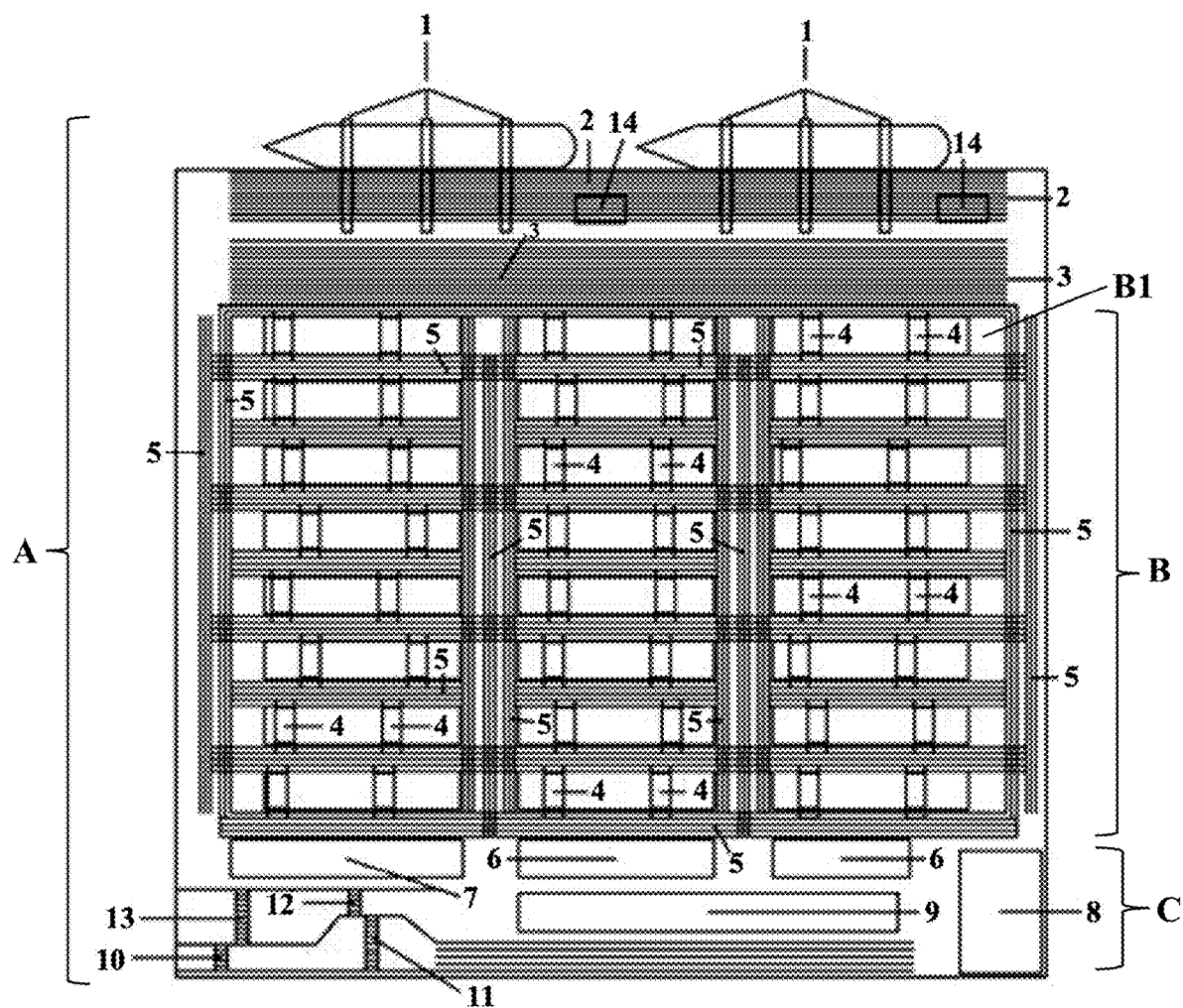
FIG. 1 is a plan sketch of the disclosure.

In the drawings, the following reference numbers are used: 1. Shore crane; 2. Operation lane area between two rails of shore cranes; 3. Operation area from rear side of landside rail of shore cranes to yard; 4. Automatic rail-mounted gantry crane in yard; 5. Operation lane area of yard; 6. Reserved yard; 7. Artificial intelligence transport robot maintenance and test area; 8. Centralized control center; 9. Buffering parking area; 10. Arrival pre-gate; 11. Arrival main gate; 12. Departure pre-gate; 13. Departure main gate; 14. Lambdoidal reverse operation area of inner container trucks; 15. Ship lofting operation area; 16. Loading/unloading operation area of the inner container trucks; 17. Hatch cover area; 18. Unlocking and locking area of the inner container trucks; 19. Unlocking and locking buffer area; 20. Passing area of the inner container trucks; 21. Charging area of the inner container trucks; 22. Artificial intelligence transport robot operation lane; 23. Artificial intelligence transport robot overtaking lane; 24. Outer container truck operation lane; 25. Outer container truck overtaking lane; 26. Fence; A. Container terminal; B. Automatic container yard area; B1. Yard; and C. Facilities behind the automatic container yard area.

DETAILED DESCRIPTION OF THE INVENTION

To further illustrate, embodiments detailing a loading/unloading system and method for a quay type full-automatic container terminal are described below. It should be noted that the following embodiments are intended to describe and not to limit the disclosure.

Detailed description of specific embodiments of the disclosure will be made below in combination with drawings and preferred embodiments. Referring to FIG. 1, FIG. 2, FIG. 3 and FIG. 4, a loading/unloading system for a quay type full-automatic container terminal provided by the disclosure comprises a plurality of shore cranes 1, an operation lane area 2 between two rails of the shore cranes, an operation area 3 from a rear side of a landside rail of the shore crane to a yard, an automatic container yard area B, an operation lane area 5 of the yard and facilities behind the yard C, where the shore cranes are single trolley double 20 ft shore cranes, and the shore cranes are disposed in parallel at a front edge of the container terminal to autonomously complete the shipping and unshipping operations of containers, and autonomously complete the loading/unloading processes of artificial intelligence transportation robots through information interaction with an artificial intelligence transportation robot system; the operation lane area 2 between two rails of the shore cranes are divided into three segmented operation areas: a lambdoidal reverse operation area of inner container trucks 14, a ship lofting operation area 15 and a loading/unloading operation area of the inner container trucks 16, which are physically isolated by fences to ensure safe operation; the operation area 3 from the rear side of the landside rail of the shore crane to the yard is successively divided into five sub-areas from the seaside to the landside: a hatch cover area 17, an unlocking and locking area of the inner container trucks 18, an unlocking and locking buffer area 19, a passing area of the inner container trucks 20 and a charging area of the inner container trucks 21, which are not physically isolated, thereby facilitating cooperation among the areas in operation and improving the operating and passing efficiencies of the container trucks. The facilities behind the yard comprise intelligent arrival and departure gates, an in-yard parking lot, an auxiliary building area and the like, which is convenient for recording information of the outer container trucks arriving and departing the port and arranging collecting and distributing operations of the outer container trucks.

Referring to FIG. 1, in the disclosure, the seaside and landside horizontal transportation operations are segmented to reduce the passing and operating interactions of the seaside and landside horizontal transportation devices in the harbor district to the maximum extent, so that the operation efficiency of the horizontal transportation system in the harbor district is improved. Further, the inner container trucks pass through the operation lane area 2 between two rails of the shore crane, the operation area 3 from the rear side of the landside rail of the shore crane to the yard and the inner container truck operation lane area in the yard along an anticlockwise direction to complete container loading/unloading operations in the inner container truck operation lane area in the yard; the outer container trucks pass though the facilities behind the yard and the outer container truck operation lane area in the yard along a clockwise direction to complete collecting and distributing operations in the outer container truck operation lane area in the yard.

Referring to FIG. 1, the container terminal is disposed in a quay type, and a loading while unloading manner is used when vehicles enter a container area to operate. Referring to FIG. 1, container operation berths are disposed in a full type, and a plurality of berths are disposed at the water front of the container terminal in a "-" shape. Referring to FIG. 1, the lambdoidal reverse operation area of inner container trucks 14 is dynamically disposed at the front edge of the container terminal according to changes of the berths for realizing reverse operation of the containers, thereby satisfying the requirements on container loading/unloading operations.

Figure 3:
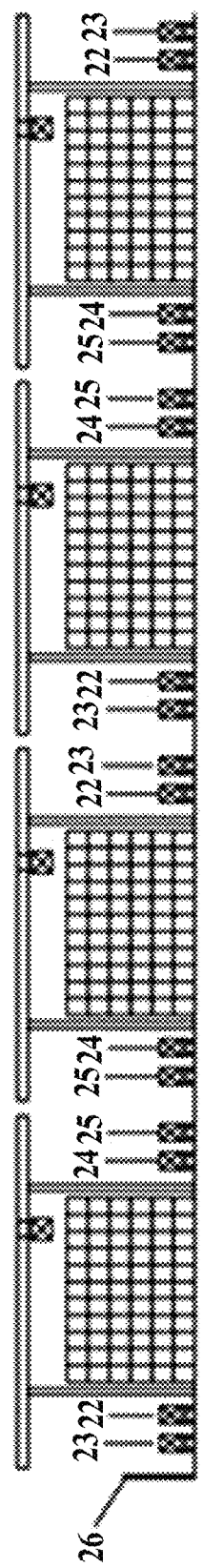
FIG. 3 is a side view schematic diagram of an operation system in a yard area of a terminal in the disclosure.

Further, referring to FIG. 1 and FIG. 3, the automatic container yard area B is disposed in parallel to and adjacent to the operation area at the front edge of the container terminal, and comprises a plurality of yards B1 disposed in parallel to the water front of the container terminal, the reserved yard 6, the artificial intelligence transport robot maintenance and test area 7 and a plurality of automatic rail-mounted gantry cranes 4 disposed in parallel to the yards B1. In the disclosure, each yard B1 is provided with 1-2 automatic rail-mounted gantry cranes (the quantity of the automatic rail-mounted gantry cranes is disposed differentially according to difference functional divisions and actual operation amounts of the yard). Meanwhile, in order to cope with increase of short-term loading/unloading volumes of the yard and failure of the rail-mounted gantry cranes, a plurality of rail-mounted gantry cranes is additionally reserved to facilitate timely disposal of emergencies.

Further, referring to FIG. 1 and FIG. 3, with respect to facilities behind the yard, the arrival and departure gates of the terminal (comprising the arrival pre-gate 10, the arrival main gate 11, the departure pre-gate 12 and the departure main gate 13), the parking lot 9 in the yard, the auxiliary building area and the like behind the automatic container yard. In combination of integration of the container terminal and flow direction of external collecting and distributing vehicles, the arrival and departure gates are disposed in a separated form parallel to the yard and all are intelligent gates. The parking lot 9 in the yard is disposed after the outer container trucks arrive for waiting operations when problematic vehicles stop to dispose problems and loading/unloading devices in the yard are busy and are unavailable. The centralized control center 8, the reserved yard 6 and the artificial intelligence transport robot maintenance and test area 7 are disposed in parallel behind the yard, thereby facilitating pass-in and pass-out of management staff in the harbor district, expansion of ability of the yard, maintenance operation of the devices and the like.

Figure 2:
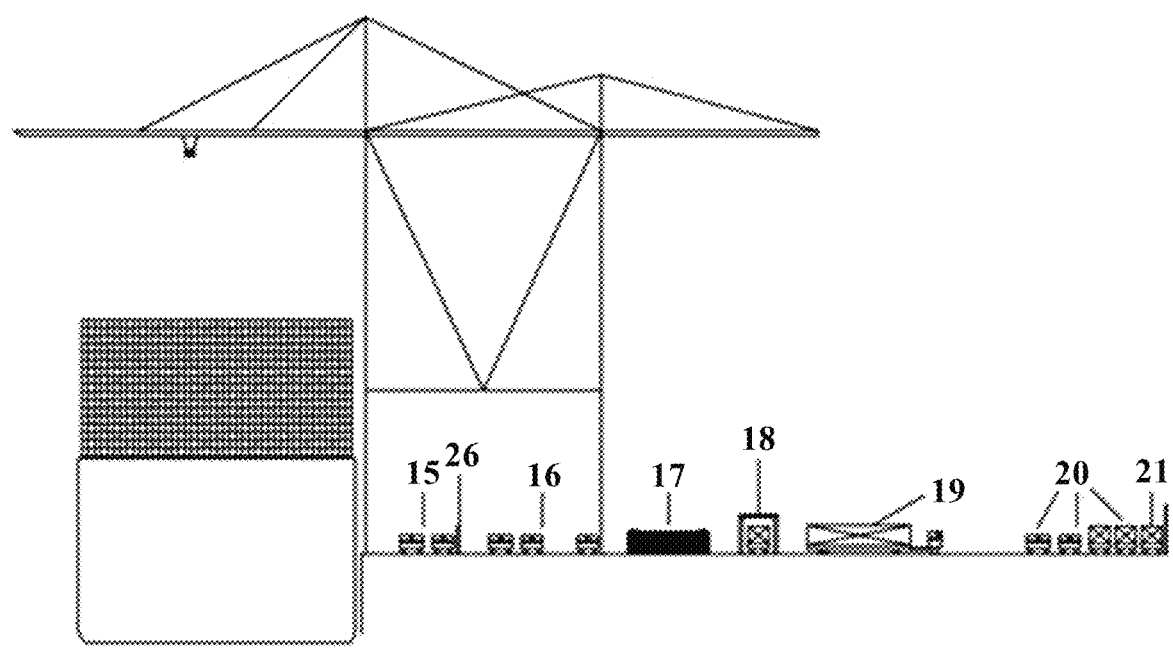
FIG. 2 is a side view schematic diagram of an operation system at a front edge of a terminal in the disclosure.

Further, referring to FIG. 2, the shipping and unshipping operation area at the front edge of the container terminal is divided into the ship lofting operation area 15 and the loading/unloading operation area of the inner container trucks 16. The ship lofting operation area 15 comprises three passing lanes, and the loading/unloading operation area of the inner container trucks 16 comprises five passing lanes. The two operation areas are independent and are isolated by a fence, so as to ensure safe operations. The five lanes of the loading/unloading operation area of the inner container trucks are further divided into three loading/unloading operation lanes and two overtaking lanes. When there are inner container trucks operating in the loading/unloading operation lanes, other inner container trucks can drive into a next vacant operation position from the overtaking lanes. The method contributes to alleviating congestion of operation at the front edge of the container terminal, thereby improving the operating and passing efficiencies of the inner container trucks.

Further, referring to FIG. 2, the hatch cover area 17 is disposed in parallel behind the shipping and unshipping operation area, and the area not only can stack hatchway covers of ships, but also can be taken as a parking area of the inner container trucks.

Further, referring to FIG. 2, the unlocking and locking area of the inner container trucks is disposed in parallel behind the hatch cover area 17 and comprises an unlocking and locking operation area of the inner container trucks 18 and an unlocking and locking buffer area 19. An unlocking and locking operation area of the inner container trucks 18 comprises one operation lane where a plurality of movable unlocking islands are arranged, and each of the movable unlocking islands receives one inner container truck for unlocking and locking operation; the unlocking and locking buffer area 19 comprises six passing lanes of the inner container trucks, where the first and fourth passing lanes are overtaking lanes, and the second, third, fifth and sixth passing lanes are lanes for the inner container trucks to unlock and lock.

Further, the unlocking and locking buffer area 19 is divided into a buffer area before entering the lock station and a buffer area after leaving the lock station. Vehicles waiting for entering the unlocking island are located in the front buffer area to wait, and unlocked vehicles enter the back buffer area for next stage operation preparation.

Further, referring to FIG. 2, the passing area of the inner container trucks 20 comprises four passing lanes, where the first and second lanes are southing lanes and the third and fourth passing lanes are northing lanes.

Further, referring to FIG. 2, the charging area of the inner container trucks 21 comprises one operation lane where a plurality of charging devices is disposed in parallel, and the inner container trucks drive into vacant charging spots of the charging lanes from the passing lanes for charging operation.

Further, referring to FIG. 1 and FIG. 3, automatic yards are disposed in the automatic container yard area according to types of the containers. Empty and heavy containers are stacked in a mixed manner in the automatic yard, and totally 8 lines 24 stack areas are arranged. The container yard area simultaneously comprises transverse lanes and longitudinal lanes; the transverse lanes of the yard are divided into inner container truck transverse lanes and outer container truck transverse lanes, which are alternately disposed on two sides of the yard, so that the passing efficiencies of the inner and outer container trucks are improved.

As shown in FIG. 3, the artificial intelligence transport robot operation lane area (the artificial intelligence transport robot operation lane 22 and the artificial intelligence transport robot overtaking lane 23) and the outer container truck operation lane area (the outer container truck operation lane 24 and the outer container truck overtaking lane 25) are disposed on two sides of the yard at an interval. The longitudinal lanes are disposed at two ends of the yard. Inner container truck longitudinal lanes and outer container truck longitudinal lanes are disposed at each end, and are physically isolated for separated passing. In order to adequately guarantee the driving safety, traffic control is performed at the intersections of the horizontal inner container truck lanes and the longitudinal outer container truck lanes through an intelligent traffic control system, that is, intelligent traffic lights and lifting levers are additionally disposed at the intersections. The inner container trucks are superior to the outer container trucks in right of way, and the inner container trucks pass after receiving scheduling instructions of the system and making judgment by their own vision systems. The above-mentioned inner and outer container truck passing strategy reduces intersections between the seaside horizontal transportation system and the landside horizontal transportation system to the maximum extent, and contributes to organizing and implementing horizontal transportation tasks, thereby improving the passing efficiency of the horizontal transportation system in the harbor district.

Further, the cooperative vehicle infrastructure system provides safe and efficient vehicular access information application services dependent on full spatio-temporal harbor road information, traffic information, moving object information and abnormal event information. Meanwhile, the system controls devices such as traffic lights and road levers to realize driving control of the outer container trucks at the intersections. The cooperative vehicle infrastructure system sends the passing information of the inner and outer container trucks to a center control platform which directly sends the passing instructions to the inner container trucks, so as to achieve the purpose of driving control of the inner and outer container trucks. Under the principle that the inner container trucks pass preferentially, it is guaranteed that the operation efficiencies of the inner and outer container trucks are maximum. The system will effectively reduce queuing congestion of driving and operation and guarantee the stability of the operation and transportation process so as to provide a strong guarantee for a task assigning system to pre-estimate the operation time, thereby improving the global optimization effect.

Further, the lane control system in the yard automatically acquires information such as vehicles and containers coming in and going out of the yard and is in abutting joint to the center control platform, so as to achieve the target of controlling release of vehicles and containers coming in and going out of the yard automatically. The control system is mainly composed of an embedded lane passing device, an RFID, an industrial network switch, an LED display screen, traffic lights, a vehicle detection device (an industrial radar detector), an electronic lifting lever, a release control system and the like. The control area comprises: intersections of inner and outer container trucks in the yard, an artificial intelligence transport robot interaction area, artificial intelligence transport robot maintenance and test area, a terminal vehicle exit area and the like. The above-mentioned control area and the control system acquire vehicle checkpoint information through a front end device, receive the releasing instruction of the center control platform, and control the LED display screen, the traffic lights and the channel lifting lever to release the container trucks according to the release instruction. The system will realize centralized control and operation and maintenance services of channel devices at entrance and exit of the yard to reduce human intervention to the maximum extent, so as to realize highly automatic operation of the system, thereby improving the speed and efficiency when the vehicles pass through the entrance and exit of the yard.

A loading/unloading process for a quay type full-automatic container terminal provided by the disclosure is described specifically in combination with drawings:

the loading/unloading operation of the automatic container terminal is completed as the terminal shipping and unshipping device, the yard loading/unloading device, the seaside horizontal transportation device and the landside horizontal transportation device cooperate. Referring to FIG. 2, the yard loading/unloading device uses the plurality of single trolley double 20 ft shore cranes disposed in parallel at the front edge of the container terminal. The rails of the shore cranes are disposed in parallel to the water front of the container terminal and are connected to the rails of the adjacent container terminal, thereby facilitating shared utilization of shore crane resources. Referring to FIG. 3, the yard loading/unloading device uses the automatic rail-mounted gantry cranes with two cantilevers. Each device can conduct operation simultaneously on two sides of the cantilevers without interfere with each other. A stowage location is disposed in a track gauge of the rail-mounted gantry crane, 11 rows of containers are stacked in each stowage location, the permitted height of the containers in each row is 6 layers, and the permitted height of the operation position of the rail-mounted gantry crane is 7 layers.

Figure 4:
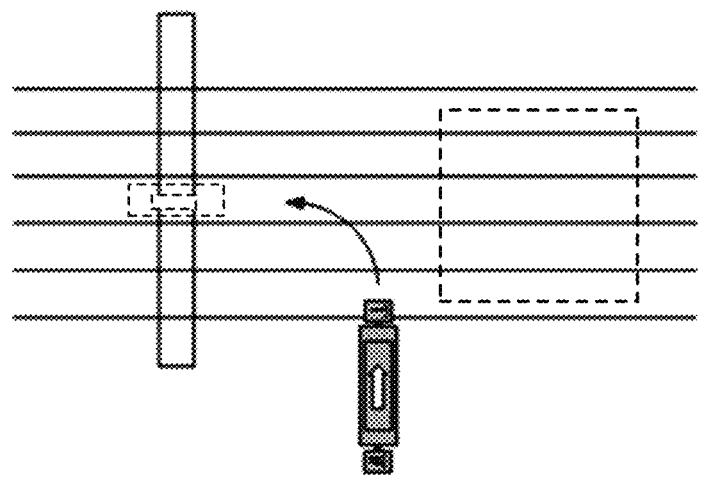
FIG. 4 is a path schematic diagram of an artificial intelligence transport robot entering an operation area of the shore cranes in a container loading/unloading forward operation mode.
Figure 5:
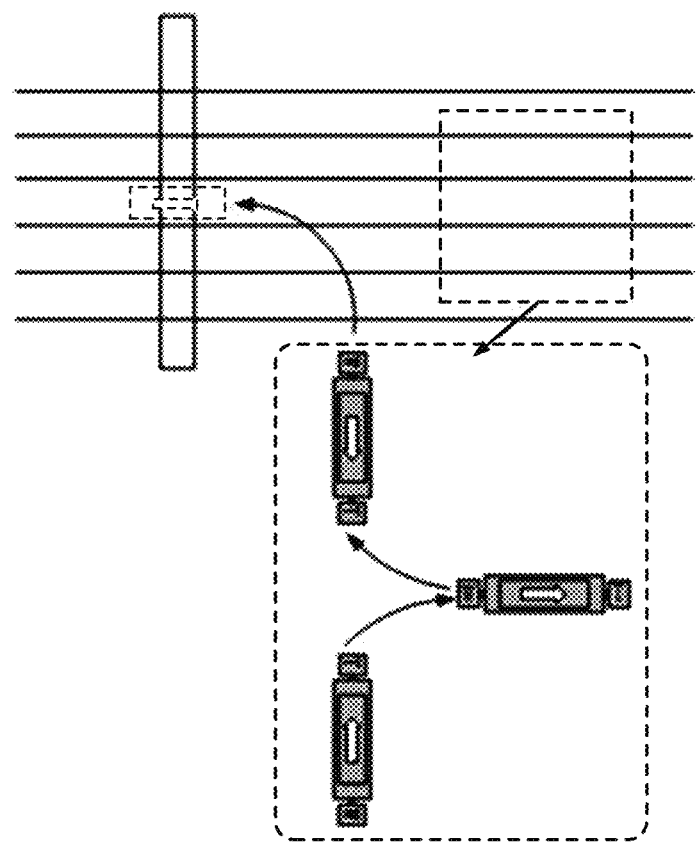
FIG. 5 is a path schematic diagram of an artificial intelligence transport robot entering an operation area of the shore cranes in a container loading/unloading reverse operation mode.

Referring to FIG. 4, with respect to the lambdoidal reverse operation area of inner container trucks 14, when the inner container trucks transport containers under the shore cranes and the direction to load and unload the containers in the shore cranes is different from the transportation direction (shown by different arrow directions in FIG. 4), it is necessary to turn the direction of the containers at the time. The rectangular area in the figure is the lambdoidal reverse operation area, and the operation task is as shown in FIG. 5. According to the characteristic that the inner container trucks drive bidirectionally, the direction of the containers is turned through the "lambdoidal" path, and the inner container trucks drive into the shore crane operation area to complete the loading/unloading task.

The seaside horizontal transportation device uses the artificial intelligence transport robots (inner container trucks). By mounting devices such as Beidou positioning systems and laser radar, millimeter-wave radar and cameras on the container trucks, without artificial intervention, appointed actions such as road driving, precise parking, container loading/unloading and barrier responding are completed intelligently, so that whole course automatic driving transportation of the container shipping and unshipping is realized.

The roadside horizontal transportation device uses container trucks (outer container trucks), and collecting and distributing drivers drive the outer container trucks to drive into the yard along the outer container truck driving lane for container loading/unloading operations.

A loading/unloading process for a quay type full-automatic container terminal provided by the disclosure is described in combination with drawing, comprising the specific steps:

S1: shipping and unshipping operation: referring to FIG. 1, FIG. 2, FIG. 3 and FIG. 4, during unshipping, containers are unloaded from a container ship by utilizing single trolley double 20 ft shore cranes, the containers are transferred to artificial intelligence transport robots waiting in the loading/unloading operation area of the inner container trucks, the containers (heavy containers, empty containers, refrigerated containers and over-limit containers) are transported by the artificial intelligence transport robots to target operation positions of the yard through the inner container truck lanes along anticlockwise directions, then the containers are hoisted by the automatic rail-mounted gantry cranes to appointed locations, and the inner container trucks are allowed to continuously enter a next operation cycle along appointed lanes, where containers carrying hazardous goods are transferred by the shore crane trolleys to the outer container trucks waiting in the ship lofting operation area under a "non-loading principle" and are directly transported out of the terminal area by the outer container trucks along a regulated route; and the shipping operation is reverse to the above-mentioned process; and S2: container collecting and dispatching operations: referring to FIG. 1 and FIG. 3, in a collecting process, the outer container trucks are allowed to drive onto the outer container truck lanes from the arrival and departure gates and the parking lot and further to enter appointed positions of the operation area of the yard, the containers are hoisted by the automatic rail-mounted gantry cranes to the appointed locations, and the outer container trucks unloading the containers are allowed to continuously leave the harbor district along the outer container truck passing lanes; the distributing process is reverse to the above-mentioned process.

It will be obvious to those skilled in the art that changes and modifications may be made, and therefore, the aim in the appended claims is to cover all such changes and modifications.

What is claimed is:

1. A loading/unloading system for a container terminal, the system comprising: a plurality of shore cranes, an operation lane area between two rails of the shore cranes, an automatic container yard area, an operation area from a rear side of a landside rail of the shore cranes to the automatic container yard area, and facilities behind the automatic container yard area;

wherein:
the operation lane area between two rails of the shore cranes comprises a lambdoidal reverse operation area of inner container trucks, a ship lofting operation area, and a loading/unloading operation area of the inner container trucks, which are physically isolated by fences;

the operation area from the rear side of the landside rail of the shore cranes to the automatic container yard area comprises a hatch cover area, an unlocking and locking area of the inner container trucks, an unlocking and locking buffer area, a passing area of the inner container trucks and a charging area of the inner container trucks, which are not physically isolated, thereby facilitating cooperation among the areas in operation;

the automatic container yard area comprises yards and a plurality of automatic rail-mounted gantry cranes disposed in parallel to the yards;

the facilities behind the automatic container yard area comprise intelligent arrival and departure gates, an in-yard parking lot and an auxiliary building area; and the container terminal is arranged in a quay layout.

2. The system of claim 1, wherein the ship lofting operation area and the loading/unloading operation area of the inner container trucks are independent and are isolated by the fences.

3. The system of claim 1, wherein the hatch cover area is used to stack hatchway covers of ships, or used as a parking area of the inner container trucks without operation.

4. The system of claim 1, wherein the lambdoidal reverse operation area of the inner container trucks is for realizing reverse operation of the containers.

5. A loading/unloading method for the container terminal using the system of claim 1, the method comprising:

S1: shipping and unshipping operation: during unshipping, unloading containers from a container ship by utilizing the plurality of shore cranes, transferring the containers to target operation positions of the yards, then hoisting, by the automatic rail-mounted gantry cranes, the containers to appointed locations, and allowing the inner container trucks to continuously enter a next operation cycle, where containers carrying hazardous goods are transferred by shore crane trolleys to the outer container trucks waiting in the ship lofting operation area and are directly transported out of the terminal area by the outer container trucks along a regulated route; and during unshipping, carrying out reverse operations as that during unshipping; and S2: container collecting and dispatching operations: in a collecting process, allowing the outer container trucks to drive from arrival and departure gates and a parking lot and further to enter appointed positions of the operation area of the yards, hoisting, by the automatic rail-mounted gantry cranes, the containers to appointed locations, and allowing the outer container trucks unloading the containers to continuously leave a harbor district; and during container dispatching, carrying out reverse operations as that during container collecting.

* * * * *